(12) United States Patent
Tsai et al.

(10) Patent No.: US 10,094,965 B2
(45) Date of Patent: Oct. 9, 2018

(54) PATTERN DISPLAYING DEVICE

(71) Applicant: Taiwan Green Point Enterprises Co., Ltd., Taichung (TW)

(72) Inventors: Ray-Long Tsai, Taichung (TW); Pei-Shan Hsieh, Taichung (TW); Tung-Chuan Chen, Taichung (TW); Cheng-Yen Wang, Taichung (TW); Shih-Tsung Chang, Taichung (TW)

(73) Assignee: TAIWAN GREEN POINT ENTERPRISES CO., LTD., Taichung (TW)

( * ) Notice: Subject to any disclaimer, the term of this patent is extended or adjusted under 35 U.S.C. 154(b) by 411 days.

(21) Appl. No.: 14/938,450

(22) Filed: Nov. 11, 2015

(65) Prior Publication Data

US 2016/0139321 A1 May 19, 2016

(30) Foreign Application Priority Data

Nov. 13, 2014 (TW) .............................. 103139409 A (51) Int. Cl.
*F21V 8/00* (2006.01)

(52) U.S. Cl.
CPC ......... *G02B 6/0035* (2013.01); *G02B 6/0036* (2013.01); *G02B 6/0055* (2013.01); *G02B 6/0068* (2013.01); *G02B 6/0073* (2013.01); *G02B 6/0083* (2013.01)

(58) Field of Classification Search
CPC .. G02B 6/0035; G02B 6/0036; G02B 6/0055; G02B 6/0068; G02B 6/0078; G02B 6/0083
See application file for complete search history.

(56) References Cited

U.S. PATENT DOCUMENTS

| | | | |
|---|---|---|---|
| 6,454,452 B1* | 9/2002 | Sasagawa | G02B 6/0061 349/65 |
| 8,246,233 B2* | 8/2012 | Cornelissen | G02B 6/0055 362/612 |
| 8,372,316 B2 | 2/2013 | Kamikatano et al. | |
| 2006/0013002 A1* | 1/2006 | Coushaine | F21V 29/70 362/308 |
| 2016/0259117 A1* | 9/2016 | Wang | G02F 1/133615 |

FOREIGN PATENT DOCUMENTS

TW        I427341        2/2014

\* cited by examiner

*Primary Examiner* — Anabel Ton
(74) *Attorney, Agent, or Firm* — Volpe and Koenig, P.C.

(57) ABSTRACT

A pattern displaying device includes a light path changing element, a first light source, a second light source, and a control module. The light path changing element has first inclined surfaces to reflect light and arranged into a first predetermined pattern, and second inclined surfaces to reflect light and arranged into a second predetermined pattern. The first light source is operable to emit light toward the first inclined surfaces to display the first predetermined pattern. The second light source is operable to emit light toward the second inclined surfaces in order to display the second predetermined pattern. The control module is electrically connected to the first and second light sources to control the first and second light source to emit light or not.

15 Claims, 10 Drawing Sheets

PATTERN DISPLAYING DEVICE

CROSS-REFERENCE TO RELATED APPLICATION

This application claims priority of Taiwanese Patent Application No. 103139409, filed on Nov. 13, 2014.

FIELD

Embodiments of the present disclosure generally relate to a pattern displaying device, more particularly to a pattern displaying device that reflects light sources by means of a reflective structure to display a pattern.

BACKGROUND

Conventional portable electronic products are designed to be relatively light, thin, and small so that they can be easily carried by users. Such a portable electronic product generally displays a pattern by means of a pattern displaying device, which reflects a directional light source via a reflective structure to display a predetermined pattern.

Taiwanese Patent No. 1427341 discloses a displaying device including a plurality of light guide plates that are stacked together and that have reflective portions, and a plurality of light sources that correspondingly cooperate with the light guide plates. Each of the light plates has a plurality of reflective portions that constitute predetermined patterns, so that different patterns can be respectively displayed by different light guide plates by means of lighting different light sources. However, the displaying device may show different patterns by simultaneously using a plurality of light guide plates, resulting in a more complicated structure that occupies more space within the electronic product. In addition, adoption of multiple light guide plates requires higher manufacturing costs of the electronic product.

On the other hand, Taiwanese Patent No. 1283779 discloses a pattern displaying device that includes a light guide plate and two light sources. The light guide plate is formed with two sets of triangular cavities. When the two light sources are simultaneously illuminated, the light guide plate may display a predetermined pattern. Such a pattern displaying device is monotonous and has less variety in terms of operation and use.

SUMMARY

Certain embodiments of the disclosure provide a pattern displaying device that may alleviate at least one of the drawbacks of the prior art.

In certain embodiments of the disclosure, a pattern displaying device may include a light path changing element, a first light source, a second light source, and a control module.

The light path changing element may have a plurality of first inclined surfaces that are configured to reflect light incident from a first direction toward a display direction and that are arranged into a first predetermined pattern, and a plurality of second inclined surfaces that are configured to reflect light incident from a second direction toward the display direction and that are arranged into a second predetermined pattern. The first, second, and display directions are different from one another.

The first light source may be disposed at a first side of the light path changing element and operable to emit light toward the first inclined surfaces in the first direction in order to display the first predetermined pattern toward the display direction.

The second light source may be disposed at a second side of the light path changing element and operable to emit light toward the second inclined surfaces in the second direction in order to display the second predetermined pattern toward the display direction.

The control module may be electrically connected to the first and second light sources and operable to simultaneously control one of the first and second light sources to emit light and the other one of the first and second light sources not to emit light.

BRIEF DESCRIPTION OF THE DRAWINGS

Other features and advantages of the disclosure will become apparent in the following detailed description of the exemplary embodiments with reference to the accompanying drawings, of which.

DETAILED DESCRIPTION OF THE EXEMPLARY EMBODIMENTS

It may be noted that like elements are denoted by the same reference numerals throughout the disclosure.

Figure 1:
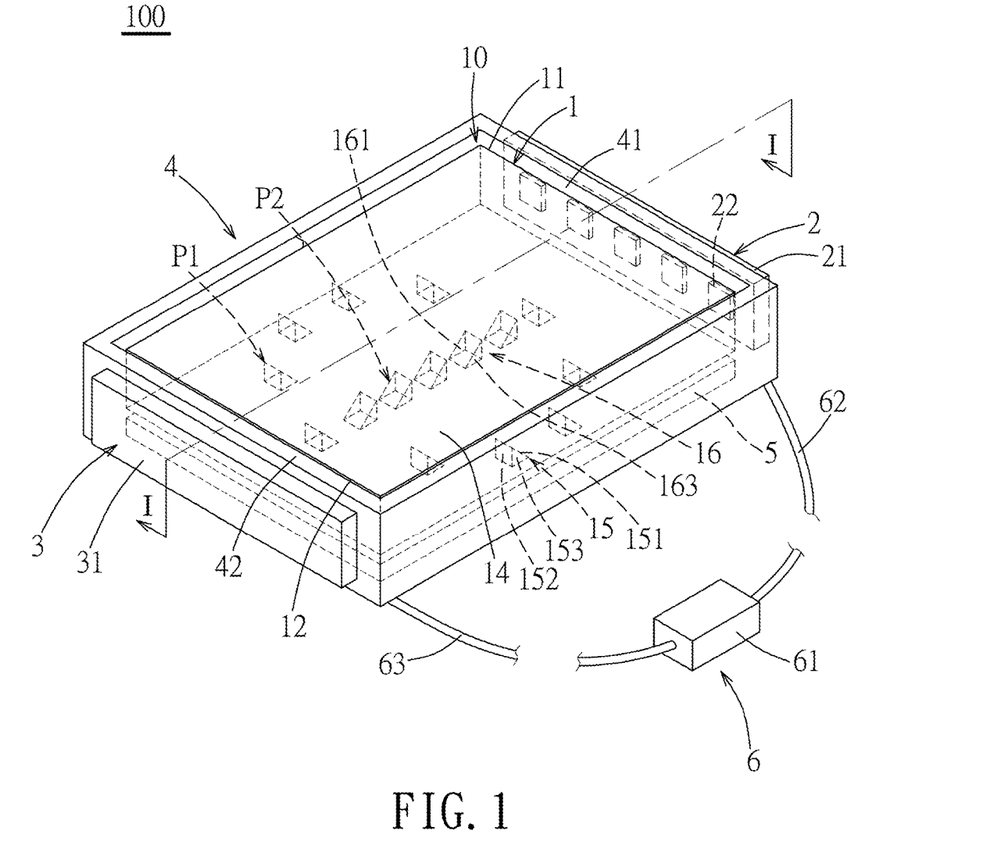
FIG. 1 a perspective view of a first embodiment of a pattern displaying device according to the disclosure, illustrating an assembly relationship between a light path changing element, a first light source, a second light source, a light absorbing element, a reflective plate, and a control module.
Figure 2:
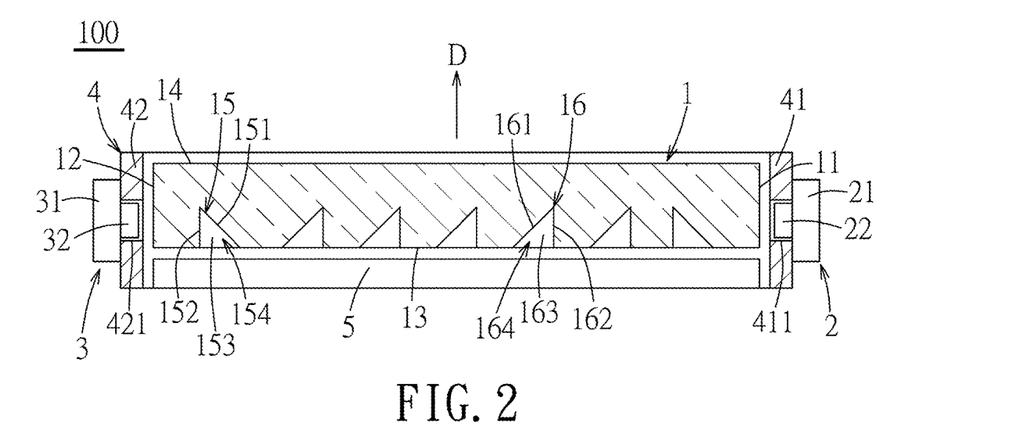
FIG. 2 is a cross sectional view taken along the line I-I in FIG. 1, illustrating the assembly relationship between the light path changing element, the first light source, the second light source, the light absorbing element, and the reflective plate.

Referring to FIGS. 1 and 2, the first embodiment of a pattern displaying device 100 according to the disclosure is shown. FIG. 2 is a cross sectional view taken along the line I-I in FIG. 1. The pattern displaying device 100 comprises a light path changing element 1, a first light source 2, a second light source 3, a light absorbing element 4, a reflective plate 5, and a control module 6. The pattern displaying device 100 may be used in a portable electronic product, such as a mobile phone, or a wearable electronic product, such as a sensor wristband. The various modes of use of the electronic product may be indicated by a pattern displayed by the pattern displaying device 100.

The light path changing element 1 is configured as a light guide plate that is made of a transparent material. The transparent material may be, for example, polymethylmethacrylate (PMMA), polycarbonate (PC), silicone rubber, thermoplastic polyurethane (TPU), or the like. The light path changing element 1 may, for example, be configured in a rectangular shape and include a first side 11, a second side 12, a surface 13 that interconnects the first and second sides 11, 12, a display surface 14 that interconnects the first and second sides 11, 12 and that is opposite to the surface 13, a plurality of first microstructures 15 that are formed on the surface 13, and a plurality of second microstructures 16 that are formed on the surface 13. The first side 11 may be a first incident surface, while the second side 12 is a second incident surface. The surface 13 is perpendicular to the first and second sides 11, 12, and the display surface 14 is also perpendicular to the first and second sides 11, 12.

Each of the first microstructures 15 comprises a first inclined surface 151, a first connecting surface 152, and two opposite first side surfaces 153. In this embodiment, the first inclined surface 151 extends inclinedly toward the display surface 14 and is connected inclinedly to the surface 13. The first inclined surface 151 has a first end that is adjacent to the surface 13 and that is proximate to the first side 11, and a second end that is adjacent to the display surface 14 and that is proximate to the second side 12. The first connecting surface 152 extends longitudinally toward the display surface 14 and is connected to the first end of the first inclined surface 151. The two first side surfaces 153 extend toward the display surface 14 from the surface 13, are connected to opposite sides of the first inclined surface 151 and opposite sides of the first connection surface 152, and are spaced apart from each other. The first inclined surface 151, the first connecting surface 152, and the two first side surfaces 153 cooperatively define a first cavity 154 that is in the shape of a right triangle and that opens at the surface 13. The first inclined surfaces 151 of the first microstructures 15 are arranged into a first predetermined pattern (P1). In this embodiment, the first predetermined pattern (P1) is exemplified as an annular shape, but it should be noted that the first predetermined pattern (P1) is not limited to the annular shape as disclosed in this embodiment, i.e., the first predetermined pattern (P1) may be defined in other shapes based on different needs in other embodiments according to the present disclosure.

Each of the second microstructures 16 comprises a second inclined surface 161, a second connecting surface 162, and two opposite second side surfaces 163. In this embodiment, the second inclined surface 161 extends inclinedly toward the display surface 14 and is connected inclinedly to the surface 13. The second inclined surface 161 has a first end that is adjacent to the surface 13 and that is proximate to the second side 12, and a second end that is adjacent to the display surface 14 and that is proximate to the first side 11. The inclination direction of the second inclined surface 161 is different from that of the first inclined surface 151 so as to reflect the lights incident from different directions. The second connecting surface 162 extends longitudinally toward the display surface 14 and is connected to the first end of the second inclined surface 161. The two second side surfaces 163 extend toward the display surface 14 from the surface 13, are connected to opposite sides of the second inclined surface 161 and opposite sides of the second connecting surface 162, and are spaced apart from each other. The second inclined surface 161, the second connecting surface 162, and the two second side surfaces 163 of each of the second microstructures 16 cooperatively define a second cavity 164 that is in the shape of a right triangle and that opens at the surface 13. The second inclined surfaces 161 of the second microstructures 16 are arranged into a second predetermined pattern (P2). In this embodiment, the second predetermined pattern (P2) is exemplified to have a linear shape and is surrounded by the first predetermined pattern (P1). It should be noted that the second predetermined pattern (P2) is not limited to the linear shape as disclosed in this embodiment, i.e., the second predetermined pattern (P2) may be defined in other shapes based on different needs in other embodiments according to the present disclosure.

The first light source 2 is disposed at the first side 11 of the light path changing element 1, and the light incident from the first light source 2 is able to enter into the light path changing element 1 through the first side 11 thereof. The first inclined surfaces 151 of the first microstructures 15 are configured to reflect the light incident from a first direction, i.e., from the first side 11, toward a display direction (D) away from the surface 13. The light reflected by the first inclined surfaces 151 will exit the light path changing element 1 through the display surface 14 to display the first predetermined pattern (P1). In this embodiment, the first light source 2 includes an elongated first flexible circuit board 21, and a plurality of first light-emitting diodes (LEDs) 22 that are electrically connected to the first flexible circuit board 21 and that are spaced apart from one another. Each of the first light-emitting diodes 22 has a light-emitting surface facing and being spaced apart from the first side 11.

The second light source 3 is disposed at the second side 12 of the light path changing element 1, and the light incident from the second light source 3 is able to enter into the light path changing element 1 through the second side 12 thereof. The second inclined surfaces 161 of the second microstructures 16 are configured to reflect the light incident from a second direction, i.e., from the second side 12, toward the display direction (D). The light reflected by the second inclined surfaces 161 will exit out of the light path changing element 1 through the display surface 14 to display the second predetermined pattern (P2). In this embodiment, the second light source 3 includes an elongated second flexible circuit board 31, and a plurality of second light-emitting diodes 32 that are electrically connected to the second flexible circuit board 31 and that are spaced apart from one another. Each of the second light-emitting diodes 32 has a light-emitting surface facing and being spaced apart from the second side 12.

It should be noted that the colors of light emitted from the first light-emitting diodes 22 of the first light source 2 and from the second light-emitting diodes 32 of the second light source 3 may be the same or different, and can be adjusted in accordance with actual requirements on the pattern displaying device of the present disclosure.

The light absorbing element 4 is annular and disposed to surround an outer surrounding surface 10 of the light path changing element 1. The light absorbing element 4 is made of a dark-colored light absorbing material. In this embodiment, the light absorbing element 4 may be made of, for example, a black adhesive tape. The light absorbing element 4 has a first side segment 41 and a second side segment 42 that is opposite to the first side segment 41. The first side segment 41 is disposed between the first light source 2 and the first side 11 of the light path changing element 1, and is formed with a plurality of first through holes 411 respectively corresponding in position to the first light-emitting diodes 22 of the first light source 2. In this embodiment, each of the first light-emitting diodes 22 extends through the corresponding one of the first through holes 411, so that the light incident from each of the first light-emitting diodes 22 can enter into the light path changing element 1 through the first side 11. The second side segment 42 is disposed between the second light source 3 and the second side 12 of the light path changing element 1 and is formed with a plurality of second through holes 421 respectively corresponding in position to the second light-emitting diodes 32 of the second light source 3. In this embodiment, each of the second light-emitting diodes 32 extends through the corresponding one of the second through holes 421, so that the light incident from each of the second light-emitting diodes 32 can enter into the light path changing element 1 through the second side 12. If the light incident from the first and second light sources 2, 3 and into the light path changing element 1 is going to exit the outer surrounding surface 10 of the light path changing element 1, such light will be absorbed by the light absorbing element 4. Therefore, it can be ensured that the light incident from the first and second light sources 2, 3 and into the light path changing element 1 may only be reflected by the first inclined surfaces 151 of the first microstructures 15 and the second inclined surfaces 161 of the second microstructures 16 without exiting the outer surrounding surface 10 of the light path changing element 1.

It should be noted that the light absorbing element 4 may be directly attached to the outer surrounding surface 10 of the light path changing element 1, rather than having a gap therebetween as illustrated in the drawings. In addition, each of the first light-emitting diodes 22 may only be aligned with the corresponding one of the first through holes 411 without extending therethrough. Similarly, each of the second light-emitting diodes 32 may only be aligned with the corresponding one of the second through holes 421 without extending therethrough.

The reflective plate 5 may be configured in a rectangular shape. The shape and size of the reflective plate 5 may be the same as those of the light path changing element 1. The reflective plate 5 is disposed below the light path changing element 1 and has a gap therebetween. It is known that when light is transmitted from one kind of medium into another, for example, from polycarbonate into air, refraction of light will occur, that is, the speed and direction of light may vary. Since the reflective plate 5 is made of a material having excellent light-reflecting characteristics, such as aluminum, the light refracted from the light path changing element 1 but not in the display direction (D) may be reflected by the light-reflecting plate 5, and again enter into the light path changing element 1 so as to further improve utilization efficiency of the light incident from the first and second light sources 2, 3.

The control module 6 is electrically connected to the first flexible circuit board 21 of the first light source 2 and the second flexible circuit board 31 of the second light source 3. The control module 6 includes a control element 61, a first transmission line 62 that electrically interconnects the control element 61 and the first flexible circuit board 21, and a second transmission line 63 that electrically interconnects the control element 61 and the second flexible circuit board 31. The control element 61 may be a control circuit board that can transmit a control signal through the first transmission line 62 so as to control the first light-emitting diodes 22 of the first light source 2 to be switched on or off. The control element 61 can also transmit a control signal through the second transmission line 63 so as to control the second light-emitting diodes 32 of the second light source 3 to be switched on or off. As such, the control module 6 of this embodiment may selectively control the first and second light sources 2, 3, in a manner that one of the first and second light sources 2, 3 emits light while the other one of the first and second light sources 2, 3 does not, or that both the first and second light sources 2, 3 emit light, or that both the first and second light sources 2, 3 do not emit light.

Figure 3:
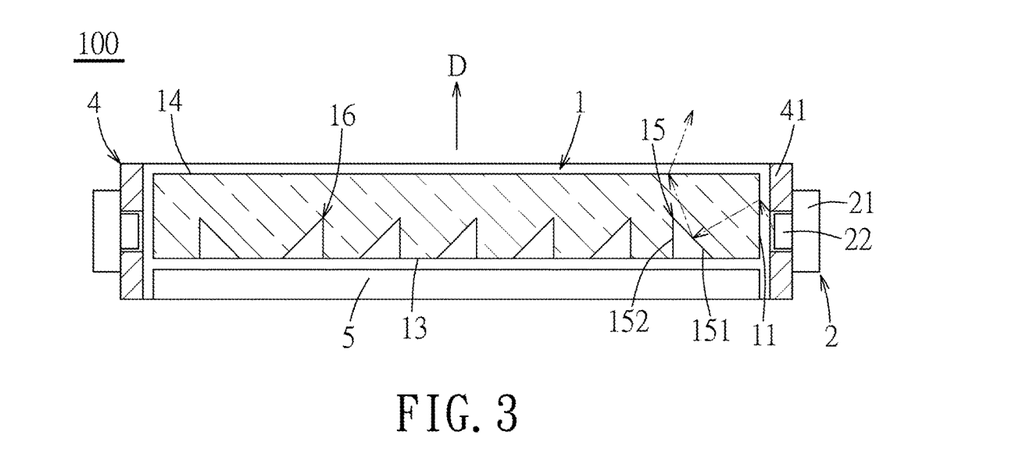
FIG. 3 is a cross sectional view of the first embodiment of the pattern displaying device according to the disclosure, illustrating a plurality of first inclined surfaces that reflect the light incident from the first light source toward a display direction.
Figure 4:
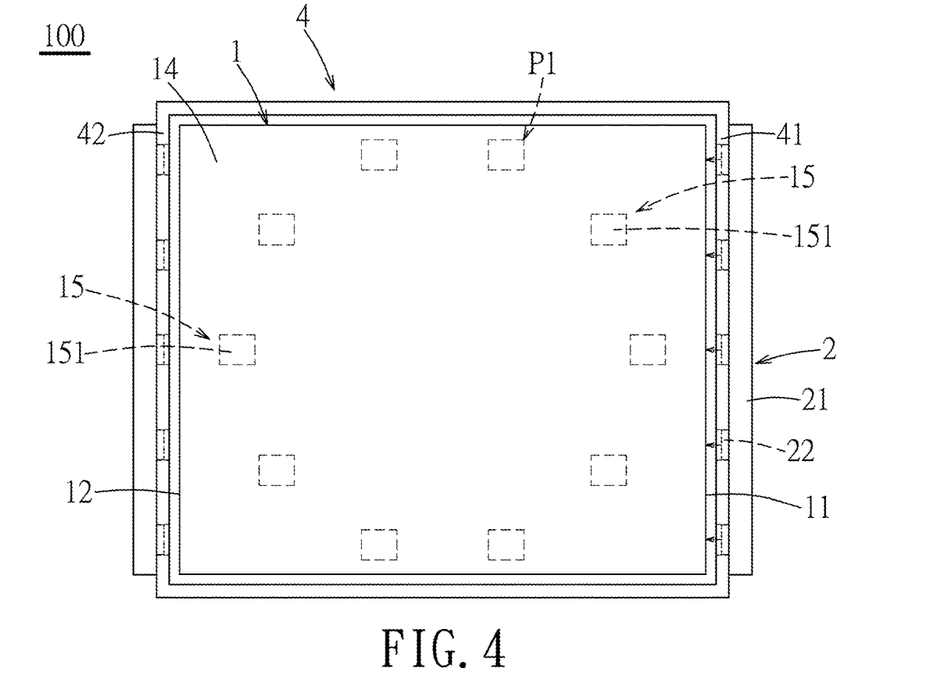
FIG. 4 is a top view of the first embodiment of the pattern displaying device according to the disclosure, illustrating a first predetermined pattern displayed by the first inclined surfaces.

With reference to FIGS. 1, 3, and 4, when the control element 61 of the control module 6 transmits the control signal to the first flexible circuit board 21 through the first transmission line 62 to switch on the first light-emitting diodes 22, the light incident from the first light-emitting diodes 22 may enter into the light path changing element 1 through the first side 11, and the light may propagate within the light path changing element 1 by reflection at any angle and in any direction. When the light path changing element 1 has finely polished surfaces, the light may be totally reflected and propagate back and forth within the light path changing element 1 until the same fully attenuates. That is, a total reflection of the light may continue to occur within the light path changing element 1.

However, when some microstructures are incorporated into the light path changing element 1, the light incident from the first and second light sources 2, 3 may be scattered or reflected due to the microstructures, so that the light may be refracted and exit the light path changing element 1. In this embodiment, the microstructures are incorporated on the bottom of the light path changing element 1 so that the light incident toward the microstructures of the light path changing element 1 may be reflected toward the display surface 14 of the light path changing element 1 and exit therefrom.

As described above, when the light is transmitted to the first inclined surfaces 151 of the first microstructures 15, such light will be reflected toward the display direction (D) and exit the light path changing element 1 from the display surface 14 due to the first inclined surfaces 151. By such means, the first predetermined pattern (P1) can be displayed in the display direction (D) to, for instance, indicate to a user a present state of an electronic product.

Figure 5:
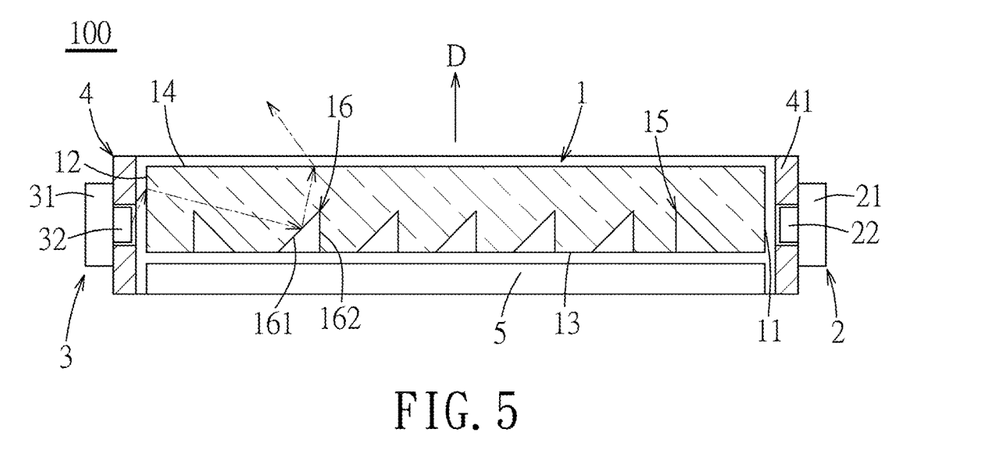
FIG. 5 is a cross sectional view of the first embodiment of the pattern displaying device according to the disclosure, illustrating a plurality of second inclined surfaces that reflect the light incident from the second light source toward the display direction.
Figure 6:
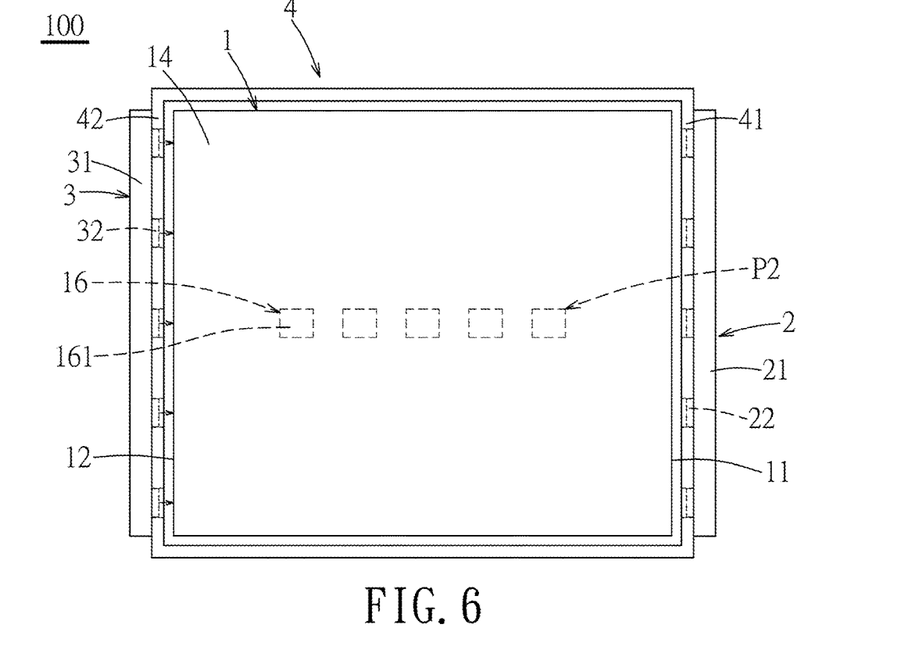
FIG. 6 is a top view of the first embodiment of the pattern displaying device according to the disclosure, illustrating a second predetermined pattern displayed by the second inclined surfaces.

With reference to FIGS. 1, 5, and 6, when the control element 61 of the control module 6 transmits the control signal to the second flexible circuit board 31 through the second transmission line 63 to switch on the second light-emitting diodes 32, the light incident from the second light-emitting diodes 32 may enter into the light path changing element 1 through the second side 12, and the total reflection of the light will continue to occur after the light enters into the light path changing element 1. When the light propagates to the second inclined surfaces 161 of the second microstructures 16, the light path thereof will change due to the second inclined surfaces 161. That is, the light may be reflected toward the display direction (D) and exit the light path changing element 1 from the display surface 14. By such means, the second predetermined pattern (P2) can be displayed in the display direction (D) to, for instance, indicate to a user the present state of the electronic product.

Figure 7:
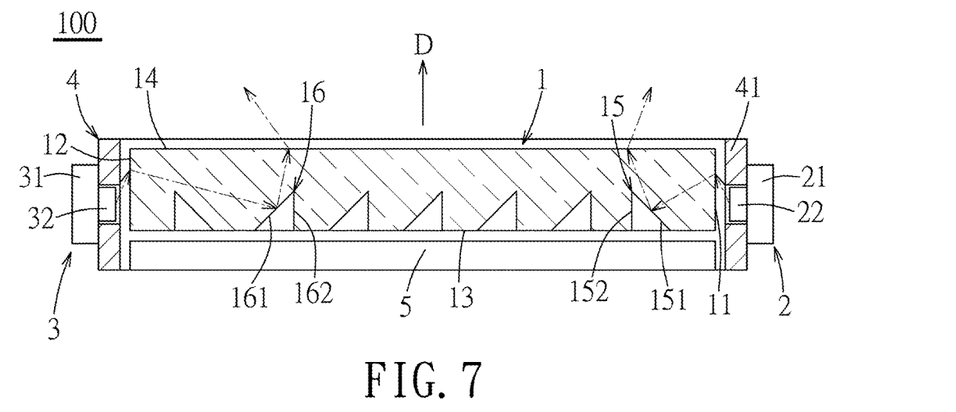
FIG. 7 is a cross sectional view of the first embodiment of the pattern displaying device according to the disclosure, illustrating the first inclined surfaces that reflect the light incident from the first light source toward the display direction, and the second inclined surfaces that reflect the light incident from the second light source toward the display direction.
Figure 8:
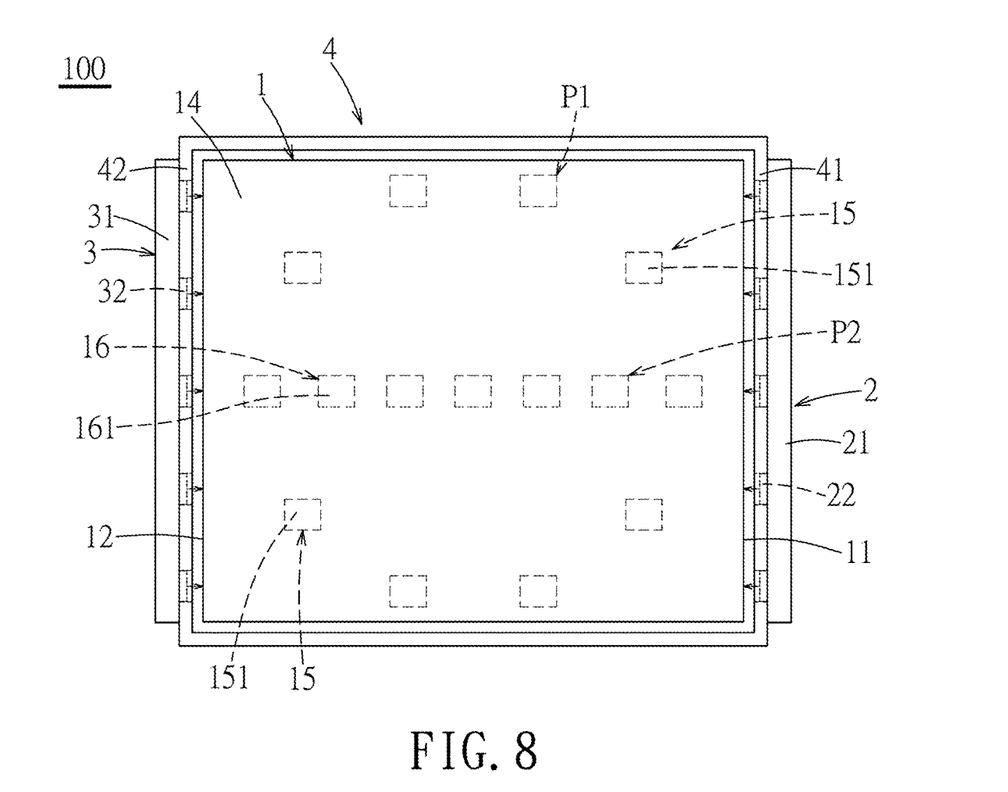
FIG. 8 is a top view of the first embodiment of the pattern displaying device according to the disclosure, illustrating the first predetermined pattern and the second predetermined pattern that are simultaneously displayed.

With reference to FIGS. 1, 7, and 8, when the control element 61 of the control module 6 transmits the control signal to both the first and second flexible circuit boards 21, 31 through the first and second transmission lines 62, 63 to switch on the first and second light-emitting diodes 22, 32, each of the first inclined surfaces 151 of the first microstructures 15 reflects the light incident from the first light-emitting diodes 22 toward the display direction (D) so as to display the first predetermined pattern (P1). In the meantime, each of the second inclined surfaces 161 of the second microstructures 16 reflects the light incident from the second light-emitting diodes 32 toward the display direction (D) so as to display the second predetermined pattern (P2). As such, the user may obtain a combined pattern generated by the first predetermined pattern (P1) and the second predetermined pattern (P2).

It is noted that the illumination duration, the illumination brightness, or the illumination sequence of the first light-emitting diodes 22 and the second light-emitting diodes 32 can be controlled by the control module 6. Various modes to display the first predetermined pattern (P1) and the second predetermined pattern (P2) can thus be made in accordance with practical needs.

Figure 9:
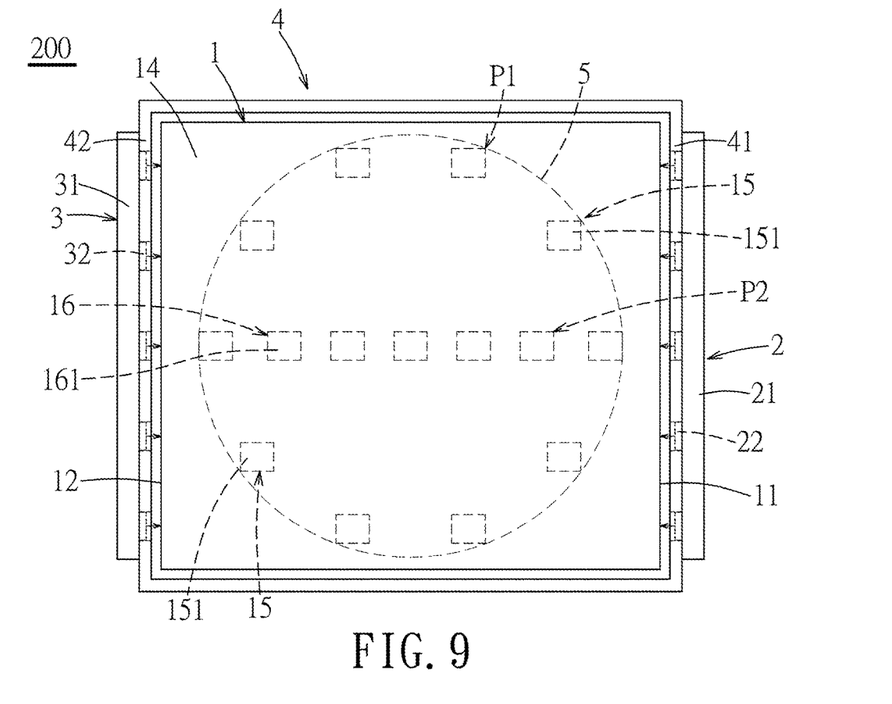
FIG. 9 is a top view of a second embodiment of the pattern displaying device according to the disclosure, illustrating a reflective plate that is circular in shape and that has an area corresponding to that of the first predetermined pattern.
Figure 10:
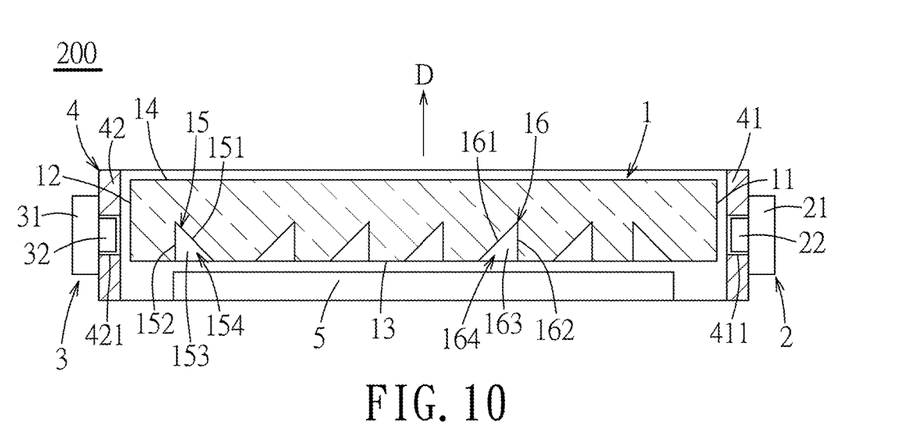
FIG. 10 is a cross sectional view of the second embodiment of the pattern displaying device according to the disclosure.

With reference to FIGS. 9 and 10, a second embodiment of the pattern displaying device 200 according to the present disclosure is illustrated. The structure and the operation of the pattern displaying device 200 are generally similar to that of the first embodiment, except for the shape of the reflective plate 5.

In this embodiment, the reflective plate 5 is a circular plate and has a reflective surface that is smaller in area compared to the light path changing element 1. The area of the reflective plate 5 corresponds to an area that encompasses the first predetermined pattern (P1), that is, the reflective plate 5 is located under an area that encompasses both the first predetermined pattern (P1) and the second predetermined pattern (P2).

It is noted that since the area of the first predetermined pattern (P1) encompasses that of the second predetermined pattern (P2) in this embodiment, the reflective plate 5 is designed to have the circular shape corresponding to the first predetermined pattern (P1). However, when the first predetermined pattern (P1) has a shape that is different from the shape as illustrated in this embodiment, the shape of the reflective plate 5 may be correspondingly modified to match the different shape. For example, when the first predetermined pattern (P1) has a triangular shape, the reflective plate 5 may be designed to be triangular.

Figure 11:
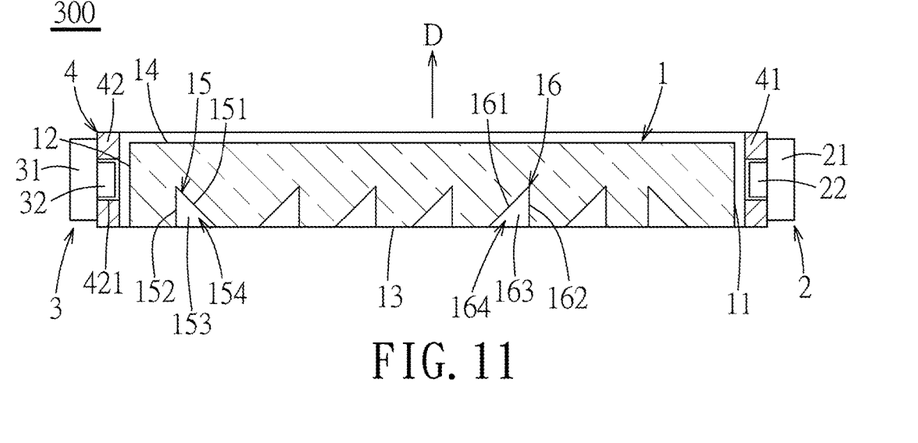
FIG. 11 is a cross sectional view of a third embodiment of the pattern displaying device according to the disclosure, illustrating that the light path changing element is configured to have a light-reflective surface.

With reference to FIG. 11, a third embodiment of the pattern displaying device 300 according to the disclosure is illustrated. The structure and the operation of the pattern displaying device 300 are generally similar to the first embodiment, except that the surface 13 of the light path changing element 1 of the pattern displaying device 300 is configured to have reflective characteristics.

In this embodiment, the reflective characteristics of the surface 13 is achieved by applying a reflective material on the surface 13. Thus, the surface 13 can reflect the light that is not transmitted toward the display direction (D). By virtue of the pattern displaying device 300 of this embodiment, the total weight of the electronic product can be decreased and the manufacturing cost thereof can be reduced.

Figure 12:
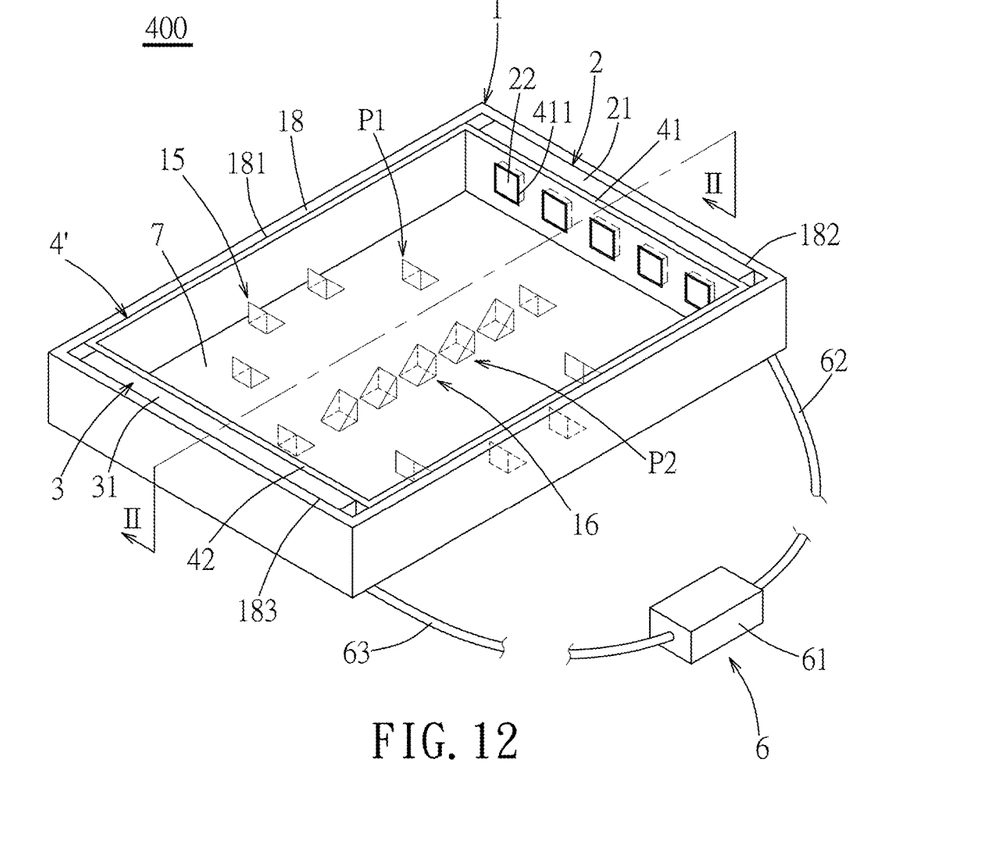
FIG. 12 is a cross sectional view of a fourth embodiment of the pattern displaying device according to the disclosure, illustrating that the light path changing element is configured as a casing.
Figure 13:
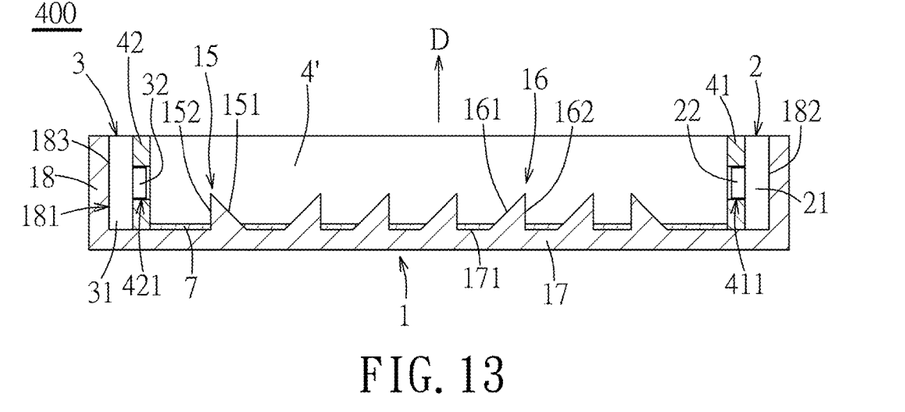
FIG. 13 is a cross sectional view taken along the line II-II in FIG. 12, illustrating the assembly relationship between the light path changing element, the first light source, the second light source, the light absorbing element, and the reflective plate.

With reference to FIGS. 12 and 13, a fourth embodiment of the pattern displaying device 400 according to the disclosure is illustrated. The structure and the operation of the pattern displaying device 400 are generally similar to the first embodiment, except that the light path changing element 1 of the pattern displaying device 400 is configured as a casing defining a receiving space, and that the first light source 2, the second light source 3, and a first light absorbing element 4' are disposed in the receiving space of the light path changing element 1.

In this embodiment, the light path changing element 1 includes a base 17, and a peripheral wall 18 extending from an outer periphery of the base 17. The base 17 has an inner bottom surface 171 and the peripheral wall 18 has an inner surrounding surface 181 that is connected to the inner bottom surface 171 to define the receiving space. The inner surrounding surface 181 has a first side 182, and a second side 183 that is opposite to the first side 182. The first light source 2 is disposed in the receiving space at the first side 182 while the second light source 3 is disposed in the receiving space at the second side 183.

Each of the first and second microstructures 15, 16 is a projection that is formed on the inner bottom surface 171 and that is configured to be right triangular. The pattern displaying device 400 further comprises a second light absorbing element 7 that is disposed on the inner bottom surface 171 of the light path changing element 1. The first light absorbing element 4' has a structure similar to that of the light absorbing element 4 of the first embodiment. The first light absorbing element 4' is disposed on the inner surrounding surface 181 of the light path changing element 1 and may be attached to the inner surrounding surface 181, for example, by gluing. The first light source 2 is disposed between a first side segment 41 of the first light absorbing element 4' and the first side 182 of the light path changing element 1. The first side segment 41 has a plurality of first through holes 411 respectively corresponding in position to a plurality of first light-emitting diodes 22. In this embodiment, each of the first light-emitting diodes 22 extends through a corresponding one of the first through holes 411. The second light source 3 is disposed between a second side segment 42 of the first light absorbing element 4'. The second side segment 42 has a plurality of second through holes 421 respectively corresponding in position to the second light-emitting diodes 32. In this embodiment, each of the second light-emitting diodes 32 extends through a corresponding one of the second through holes 421. The second light absorbing element 7 is in the form of a sheet and may be attached to the inner bottom surface 171, for example, by gluing. The first and second light absorbing element 4', 7 are made of a dark-colored light absorbing material. In this embodiment, the first and second light absorbing element 4', 7 are made of, for example, black adhesive tapes. When the lights incident from the first and second light sources 2, 3 are being transmitted to the first and second light absorbing element 4', 7, such light will be absorbed by the first and second light absorbing element 4', 7 so as to prevent total reflection of light to occur. It can thus be ensured that the light incident from the first and second light sources 2, 3 only reflects at the first inclined surfaces 151 of the first microstructures 15 and the second inclined surfaces 161 of the second microstructures 16.

Figure 14:
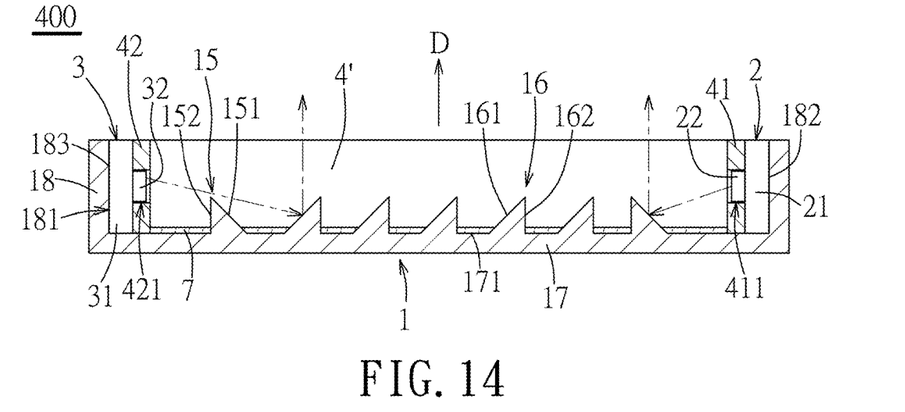
FIG. 14 is a cross sectional view of the fourth embodiment of the pattern displaying device according to the disclosure, illustrating the first inclined surfaces that reflect the light incident from the first light source toward the display direction, and the second inclined surfaces that reflect the light incident from the second light source toward the display direction.

With reference to FIGS. 12 and 14, when the control element 61 of the control module 6 transmits the control signal to the first flexible circuit board 21 through the first transmission line 62 for switching on the first light-emitting diode 22, the light incident from the first light-emitting diodes 22 may be transmitted toward the first inclined surfaces 151 of the first microstructures 15 and the second connecting surfaces 162 of the second microstructures 16. A part of the light is reflected by the first inclined surfaces 151 toward the display direction (D), and the first predetermined pattern (P1) may then be displayed. Another part of the light that is not reflected by the first inclined surfaces 151 may be reflected by the second connecting surfaces 162 toward the first side segment 41 of the first light absorbing element 4' and the second light absorbing element 7, and may be absorbed thereby.

When the control element 61 of the control module 6 transmits the control signal to the second flexible circuit board 31 through the second transmission line 63 for switching on the second light-emitting diode 32, the light incident from the second light-emitting diodes 32 may be transmitted toward the second inclined surfaces 161 of the second microstructures 16 and the first connecting surfaces 152 of the first microstructures 15. A part of the light is reflected by the second inclined surfaces 161 toward the display direction (D), and the second predetermined pattern (P2) can then be displayed. Another part of the light that is not reflected by the second inclined surfaces 161 may be reflected by the first connecting surfaces 152 toward the second side segment 42 of the first light absorbing element 4' and the second light absorbing element 7, and may be absorbed thereby.

Figure 15:
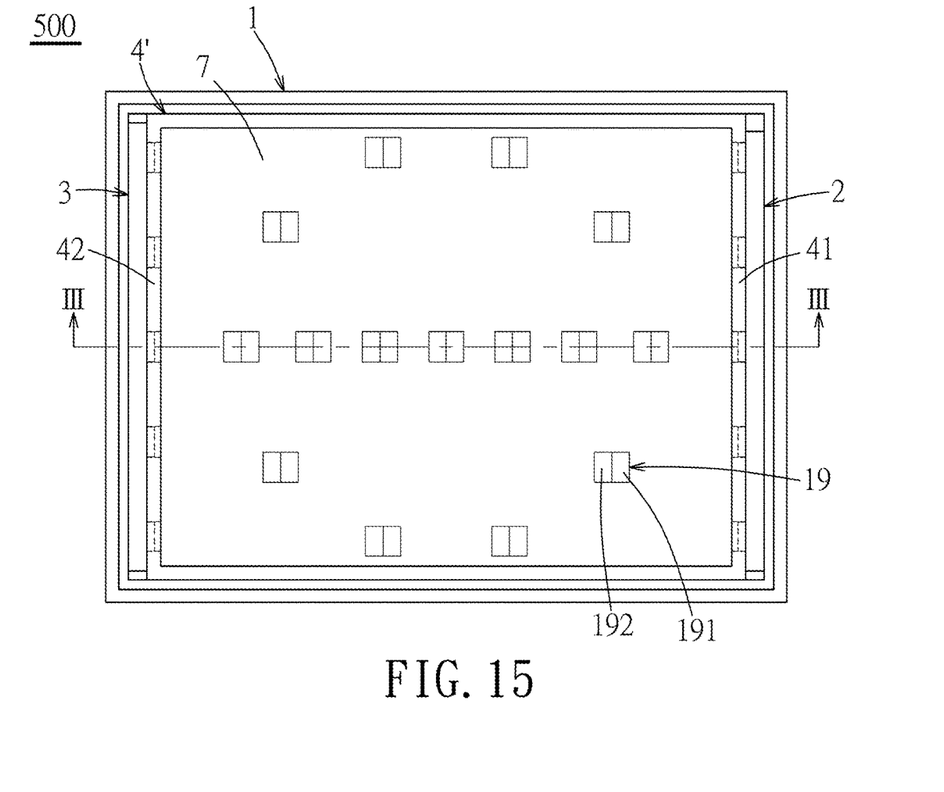
FIG. 15 is a top view of a fifth embodiment of the pattern displaying device according to the disclosure, illustrating that the first inclined surfaces are respectively connected to the second inclined surfaces.
Figure 16:
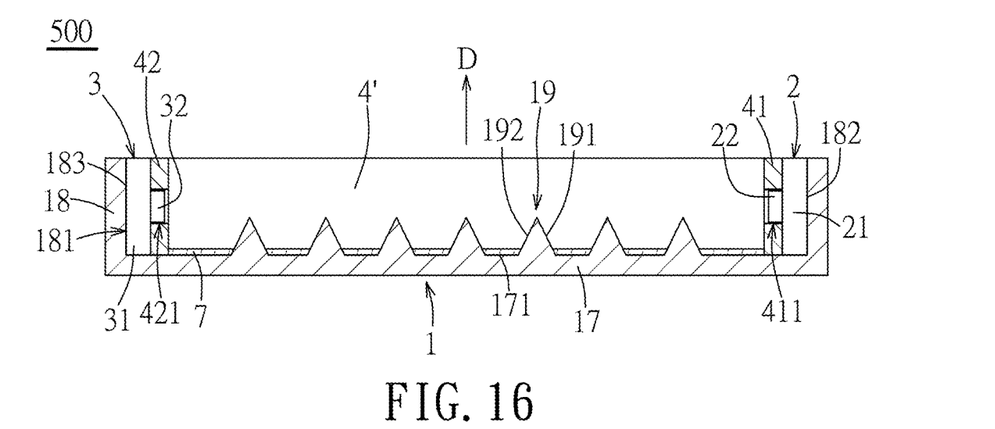
FIG. 16 is a cross sectional view of the fifth embodiment of the pattern displaying device according to the disclosure, illustrating that distal sides of the first inclined surfaces are respectively connected to distal sides of the second inclined surfaces.

With reference to FIGS. 15 and 16, a fifth embodiment of the pattern displaying device 500 of the disclosure is illustrated. FIG. 16 is a cross sectional view taken along line III-III in FIG. 15. The structure and operation of the pattern displaying device 500 are generally similar to the fourth embodiment, except for the configuration of the light path changing element 1.

The light path changing element 1 has a plurality of microstructures 19, each being an isosceles triangular projection disposed on the inner bottom surface 171. Each of the microstructures 19 includes a first inclined surface 191 that faces the first light source 2, and a second inclined surface 192 that faces the second light source 3. Each of the first and second inclined surfaces 191, 192 has a distal side distal from the inner bottom surface 171. The distal side of each of the first inclined surfaces 191 is connected to the distal side of a respective one of the second inclined surfaces 192. The first inclined surface 191 of each of the microstructures 19 is used to reflect the light incident from the first light source 2 toward the display direction (D), and the second inclined surface 192 of each of the microstructures 19 is used to reflect the light incident from the second light source 3 toward the display direction (D). In this embodiment, the colors of the first light source 2 and the second light source 3 are different. By virtue of the aforementioned designs and the control of the control module 6, a display pattern with different colors can be obtained.

Figure 17:
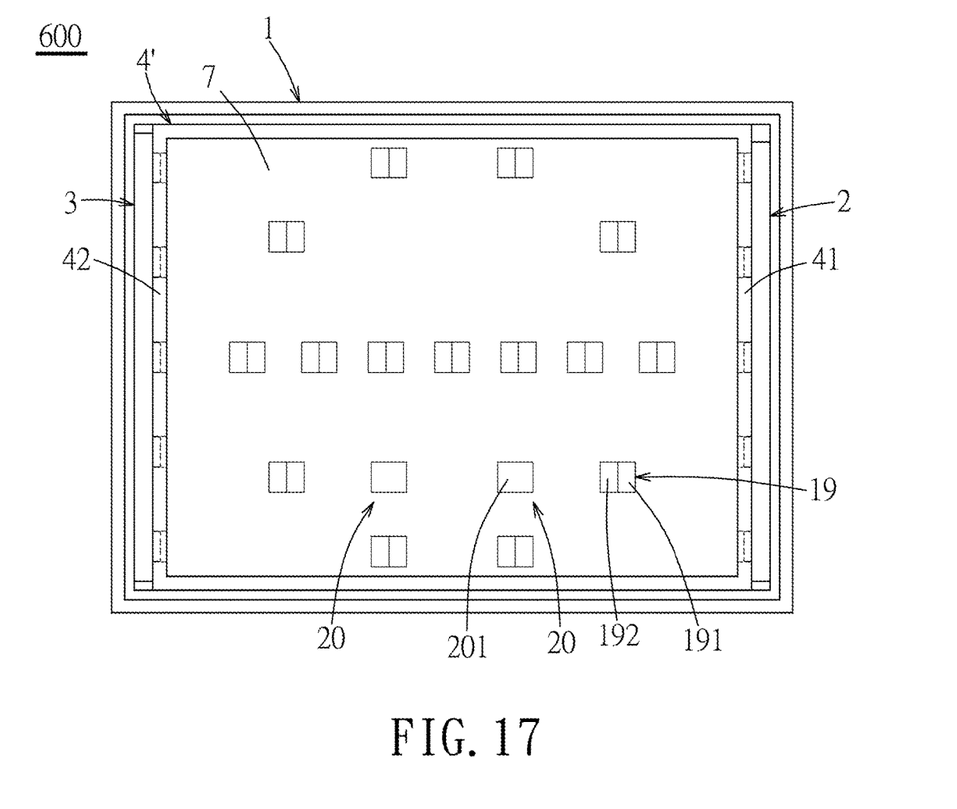
FIG. 17 is a top view of a sixth embodiment of the pattern displaying device according to the disclosure, illustrating third inclined surfaces for reflecting a light incident from the first light source.

With reference to FIG. 17, a sixth embodiment of the pattern displaying device 600 of the disclosure is illustrated. The structure and the operation of the pattern displaying device 600 are generally similar to the fifth embodiment, except that the light path changing element 1 of the pattern displaying device 600 further comprises a plurality of microstructures 20.

Each of the microstructures 20 is a projection that is disposed on the inner bottom surface 171 and that is right triangular. The shape of each of the microstructures 20 is the same as that of each of the first microstructures 15 of the fourth embodiment. A third inclined surface 201 of each of the microstructures 20 is used to reflect the light incident from the first light source 2 toward the display direction (D), so that the light incident from the first light source 2 may be reflected toward the display direction (D) through the first inclined surfaces 191 and the third inclined surfaces 201. By virtue of the aforementioned designs and the control of the control module 6, a different illuminating pattern can be obtained.

To sum up, in the pattern displaying device 100, 200, 300, 400, 500, 600 of the present disclosure, the first inclined surfaces 151 of the light path changing element 1 are arranged into the first predetermined pattern (P1), the second inclined surfaces 161 are arranged into the second predetermined pattern (P2), and the control module 6 selectively controls one of the first and the second light sources 2, 3 to emit light and the other one of the first and second light sources 2, 3 not to emit light. As such, the pattern displaying device 100, 200, 300, 400, 500, 600 can display different patterns and results in a variety of patterns as compared to the Taiwan Patent No. 1283779. In addition, in utilization of a single light path changing element 1 to include both the first inclined surfaces 151, 191 and the second inclined surfaces 161, 192, the pattern displaying device 100, 200, 300, 400, 500, 600 of the present disclosure can have a simpler structure and reduced volume, and the manufacturing cost thereof can be reduced in comparison to the Taiwan Patent No. 1427341.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A pattern displaying device, comprising:
a light path changing element having a plurality of first inclined surfaces that are configured to reflect light incident from a first direction toward a display direction and that are arranged into a first predetermined pattern, and a plurality of second inclined surfaces that are configured to reflect light incident from a second direction toward the display direction and that are arranged into a second predetermined pattern, the first, second, and display directions being different from one another;
a first light source that is disposed at a first side of said light path changing element and that is operable to emit light toward said first inclined surfaces in the first direction in order to display said first predetermined pattern toward the display direction;
a second light source that is disposed at a second side of said light path changing element and that is operable to emit light toward said second inclined surfaces in the second direction in order to display said second predetermined pattern toward the display direction;
a control module that is electrically connected to said first and second light sources and that is operable to simultaneously control one of said first and second light sources to emit light and the other one of said first and second light sources not to emit light; and
a light absorbing element that is disposed to surround an outer surrounding surface of said light path changing element.

2. The pattern displaying device according to claim 1, wherein the light path changing element further has a bottom surface that is connected to the first and second inclined surfaces, said first and second inclined surfaces being inclined relative to said bottom surface toward the display direction.

3. The pattern displaying device according to claim 1, wherein each of said first and second light sources includes a plurality of light-emitting diodes (LEDs), and said light absorbing element has:
a first side segment that is disposed between said first light source and said first side of said light path changing element and that is formed with a plurality of first through holes respectively corresponding in position to said LEDs of said first light source; and
a second side segment that is disposed between said second light source and said second side of said light path changing element and that is formed with a plurality of second through holes respectively corresponding in position to said LEDs of said second light source.

4. The pattern display device according to claim 1, wherein said light path changing element is configured as a light guide plate.

5. The pattern displaying device according to claim 1, wherein said light path changing element is configured as a casing defining a receiving space in which said first and second light sources are disposed.

6. The pattern displaying device according to claim 2, wherein said bottom surface of said light path changing element is configured to have light-reflecting characteristics.

7. The pattern displaying device according to claim 2, further comprising a reflective plate disposed on said bottom surface of said light path changing element opposite to the display direction.

8. The pattern displaying device according to claim 7, wherein said reflective plate has a reflective surface that is smaller in area compared to said bottom surface of said light path changing element and that is large enough in area to cover said first and second predetermined patterns of said first and second inclined surfaces.

9. The pattern displaying device according to claim 2, wherein each of said first and second inclined surfaces has a distal side distal from said bottom surface, and said distal side of each of said first inclined surfaces is connected to said distal side of a respective one of said second inclined surfaces.

10. A pattern displaying device, comprising:
a light path changing element that is configured as a casing defining a receiving space, and that has:
a plurality of first inclined surfaces arranged into a first predetermined pattern, said first inclined surfaces being configured to reflect light incident from a first direction toward a display direction;
a plurality of second inclined surfaces that are arranged into a second predetermined pattern, said second inclined surfaces being configured to reflect light incident from a second direction different from the first direction toward the display direction;
an inner bottom surface that is connected to said first and second inclined surfaces, said first and second inclined surfaces being inclined relative to said inner bottom surface toward the display direction; and
an inner surrounding surface that is connected to said inner bottom surface to define said receiving space; and
a first light source that is disposed in said receiving space of said light path changing element and that is operable to emit light toward said first inclined surfaces in the first direction in order to display said first predetermined pattern toward the display direction;
a second light source that is disposed in said receiving space of said light path changing element and that is operable to emit light toward said second inclined surfaces in the second direction in order to display said second predetermined pattern toward the display direction,
a first light absorbing element that is disposed on said inner surrounding surface of said light path changing element; and
a second light absorbing element that is disposed on said inner bottom surface of said light path changing element.

11. The pattern displaying device according to claim 10, further comprising a control module that is electrically connected to said first and second light sources and that is operable to simultaneously control one of said first and second light sources to emit light and the other one of said first and second light sources not to emit light.

12. The pattern displaying device according to claim 10, wherein:
the first and second light sources are respectively disposed at opposite first and second sides in said receiving space of said light path changing element, each having a plurality of LEDs;
the first light absorbing element has a first side segment that is disposed on said first light source and that has a plurality of first through holes respectively corresponding in position to said LEDs of said first light source, and a second side segment that is disposed on said second light source and that has a plurality of second through holes respectively corresponding in position to said LEDs of said second light sources.

13. The pattern displaying device according to claim 10, wherein each of said first and second inclined surfaces has a distal side distal from said inner bottom surface, and said distal side of each of said first inclined surfaces is connected to said distal side of a respective one of said second inclined surfaces.

14. A pattern displaying device, comprising:

a light path changing element having a plurality of first inclined surfaces that are configured to reflect light incident from a first direction toward a display direction and that are arranged into a first predetermined pattern, and a plurality of second inclined surfaces that are configured to reflect light incident from a second direction toward the display direction and that are arranged into a second predetermined pattern, the first, second, and display directions being different from one another, the light path changing element further has a bottom surface that is connected to the first and second inclined surfaces, said first and second inclined surfaces being inclined relative to said bottom surface toward the display direction;

a first light source that is disposed at a first side of said light path changing element and that is operable to emit light toward said first inclined surfaces in the first direction in order to display said first predetermined pattern toward the display direction;

a second light source that is disposed at a second side of said light path changing element and that is operable to emit light toward said second inclined surfaces in the second direction in order to display said second predetermined pattern toward the display direction;

a control module that is electrically connected to said first and second light sources and that is operable to simultaneously control one of said first and second light sources to emit light and the other one of said first and second light sources not to emit light; and a reflective plate disposed on said bottom surface of said light path changing element opposite to the display direction.

15. The pattern displaying device according to claim 14, wherein said reflective plate has a reflective surface that is smaller in area compared to said bottom surface of said light path changing element and that is large enough in area to cover said first and second predetermined patterns of said first and second inclined surfaces.

* * * * *